US005159358A

United States Patent [19]

Kubelik

[11] Patent Number: 5,159,358

[45] Date of Patent: Oct. 27, 1992

[54] DIVIDED SCREEN PRINTER

[75] Inventor: Igor Kubelik, Mississauga, Canada

[73] Assignee: Delphax Systems, Canton, Mass.

[21] Appl. No.: 718,352

[22] Filed: Jun. 19, 1991

[51] Int. Cl.[5] ............................................ G01D 15/06

[52] U.S. Cl. .................................................... 346/159

[58] Field of Search ......................................... 346/159

[56] References Cited

U.S. PATENT DOCUMENTS

| | | | |
|---|---|---|---|
| 4,697,196 | 9/1987 | Inaba et al. | 346/159 |
| 4,819,013 | 4/1989 | Beaudet | 346/159 |
| 4,956,670 | 9/1990 | Masuda et al. | 346/159 X |
| 5,006,869 | 4/1991 | Buchan et al. | 346/159 |
| 5,025,552 | 6/1991 | Yamaoka | 346/159 X |
| 5,068,961 | 12/1991 | Nishikawa | 346/159 X |

*Primary Examiner*—George H. Miller, Jr.
*Attorney, Agent, or Firm*—Lahive & Cockfield

[57] ABSTRACT

A printer has a print cartridge with a plurality of electrically isolated screen electrodes extending in parallel strips and maintained at different potentials to define a uniform electric field in the gap between a print cartridge and a latent imaging member curved about an axis parallel to the strips. As charge carriers are generated, the potentials on a plurality of control electrodes located between the charge carriers and overlying screen electrodes are controlled to provide a fixed bias. This assures gating of a uniform quantity of charge from different apertures of the print cartridge, as well as uniform size of the charge dots formed on the imaging member.

11 Claims, 5 Drawing Sheets

DIVIDED SCREEN PRINTER

The present invention relates to apparatus for the generation of small beams of charged particles—ions, electrons or a combination of ions electrons—and particularly to such apparatus which operates by creating a gas breakdown discharge. Apparatus of this type is widely used in so-called ionographic printing, a process in which selective electrodes of a print cartridge, consisting of a matrix array of different electrodes arranged in layers, are actuated in a phased sequence to project charge carriers in an image pattern onto a latent imaging member.

In a print cartridge of this type, two sets of electrodes, denoted driver and finger electrodes, are separated from each other by an insulating film, and are oriented transversely to each other. The region at which each driver and finger electrode cross is made to produce a discharge by applying a high voltage RF signal across the two electrodes. The collection of all such crossing points constitutes a matrix of charge generating loci. Typically, a third electrode layer, called the screen electrode, formed of a conductive sheet, is positioned with one aperture located above each crossing point. By setting the screen electrode at a selected potential, charge carriers of a desired polarity are gated from the charge generating loci toward the imaging member. Electrodes are activated in a raster-coded sequence to generate a charge image and project it onto the latent imaging member.

Typically, the latent imaging member which receives the projected charge is a drum having a hard dielectric surface layer. The drum is rotated past the print cartridge as the electrodes are activated. The print cartridge extends substantially the full width of the drum, and generally is constructed with an electrode array between one and several centimeters in width. In operation, the cartridge is aligned parallel to a tangent plane of the drum, and is spaced approximately 0.2 mm from the drum surface. Electrodes of the print cartridge are activated in quick succession to project a pattern of charge dots within the rectangle defined by the cartridge electrode pattern. The curvature of the drum results in a variation of screen-to-drum gap across this rectangle, the edge electrode holes being as much as 30–50% further from the drum than those in the center. It is well known that these edge holes suffer from a drop-off in delivered charge due to the increased distance, and they are therefore generally made of a larger diameter than the central holes, so that a greater amount of charge is projected to compensate for the drop off.

By using an electrode hole array of thinner width, the amount of drum curvature below the print cartridge would be reduced, limiting this charge drop-off effect, but requiring more frequent actuation of the print cartridge to print an entire sheet. Other approaches, of varying degrees of complexity, and resulting in differing degrees of effectiveness, may be implemented in particular systems to limit or compensate for curvature-induced variation in the image quality.

However, further reduction or elimination of this image variation remains desirable.

SUMMARY OF THE INVENTION

It is an object of the invention to reduce or eliminate latent image charge drop-off at the edges of a print cartridge.

It is another object of the invention to control blooming of latent image dots by applying electrical corrections to print cartridge actuation signals.

It is another object of the invention to provide a print cartridge of enhanced printing quality.

These and other features are obtained in accordance with the invention by a printer having a cartridge in which screen electrodes are provided to define a uniform field between the cartridge and an image-receiving member. Different potentials are applied across different electrodes so that the field strength becomes substantially the same between each hole of the print cartridge and the surface of the imaging drum and with the result that charge is deposited in the same size latent image dot at each point. In a further embodiment, a control circuit applies a back bias to control the amount of charge carriers gated out such that each hole deposits substantially the same amount of charge per actuation cycle.

A representative print cartridge for the practice of the invention includes plural drive electrodes oriented in a first direction corresponding to the page width of a print, and plural control electrodes oriented transversely thereto, the crossing points of the drive and control electrodes constituting an array of discrete points at which charges are generated. A plurality of separated screen electrode located on the opposite side of the control electrodes, extend parallel to the drive electrodes. In operation the magnitude of the potential applied to the screen electrodes is successively higher as the distance to the drum surface increases toward the edges of the array, resulting in a high uniform field strength without spark breakdown. Differing bias potentials on the control electrodes vary the quantity of charge delivered by the holes of each screen electrode. Preferably the bias potentials are switched synchronously with actuation of the RF lines to track the potential applied to the screen electrodes that lie above the active holes at any given time.

BRIEF DESCRIPTION OF DRAWINGS

These and other features of the invention will be understood from the description herein, including the drawings illustrating particular embodiments and features thereof, wherein.

DETAILED DESCRIPTION OF THE INVENTION

Figure 1:
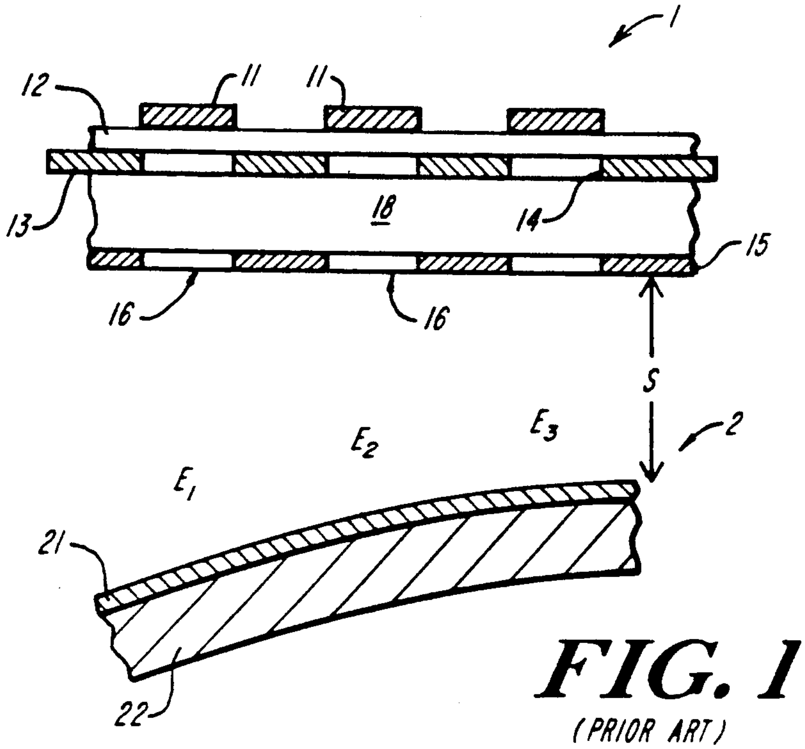
FIG. 1 (PRIOR ART)
FIGS. 1 and 1A show a cross-sectional and a cut-away view of a prior art print cartridge, illustrating a problem addressed by the invention.

FIG. 1 illustrates, by way of background, a cross-sectional and greatly magnified view through a conventional print cartridge 1 and dielectric imaging drum 2, positioned in their normal orientations for forming a latent charge image. By way of scale, the diameter of an electrode opening defining one charge dot is on the order of 0.1–0.2 mm, and the minimum spacing between the surface of the drum 2 and the print cartridge is also about 0.2 mm.

Figure 1A:
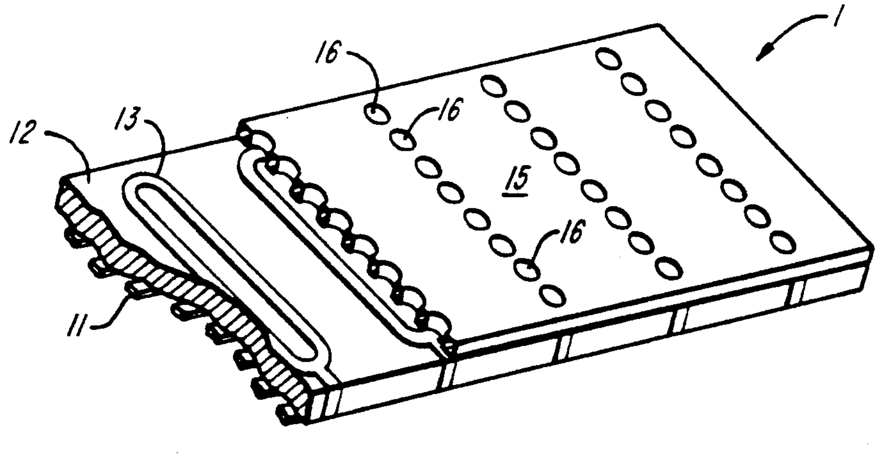
FIG. 1A (PRIOR ART)

As illustrated, the conventional print cartridge 1 includes a first plurality of driver electrodes 11 which are positioned on one side of a dielectric sheet 12, and a second plurality of control electrodes 13, called the finger electrodes, positioned such that crossing points of the two electrodes define a glow discharge region from which charge carriers may be extracted. The driver and control electrodes are each discrete conductive lines or metallized patterns, extending in mutually transverse directions. A third electrode 15 is spaced from the finger electrodes 13, and takes the form of a continuous sheet of metal having one aperture 16 positioned over each crossing point. FIG. 1A shows the cartridge 1 in a cut-away perspective view for clarity. The view is inverted from the orientation of FIG. 1.

The print drum 2 has an underlying conductive layer or body 22, and an outer dielectric surface layer 21 onto which the charge is deposited. The printhead is spaced of a nominal gap "s" which is smallest at the center of the cartridge, but increases by up to approximately thirty to fifty percent at the edge holes. In operation, the conductive layer 22 is maintained at ground potential, and screen 15 is maintained at approximately five to six hundred volts potential to provide an accelerating field to draw charged particles from the print cartridge to the drum. As a result of the curved drum geometry, the electric field strength E in the gap is lower for those apertures located increasing distances off center, away from the line of minimum gap "s". Thus, $E_1<E_2<E_3$ in the illustration.

Figure 3:
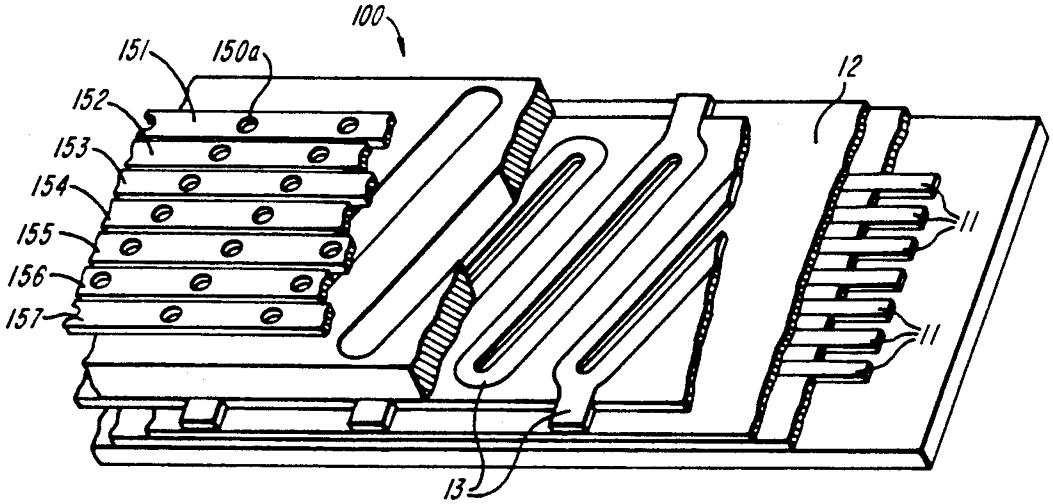
FIG. 3 shows a partially cut-away perspective view of the print cartridge of FIG. 2.

In accordance with the present invention, a different printhead construction, best seen in FIG. 3, allows this accelerating field to be controlled across the width of the print cartridge. In this embodiment 100, the basic charge generating structure, e.g., driver and finger electrodes, 11, 13 are identical to those of a conventional printhead, such as that of FIG. 1. The screen, however, is a divided structure wherein a plurality of separate electrodes extend parallel to the axis of the drum, i.e., parallel to the driver electrodes.

Figure 2:
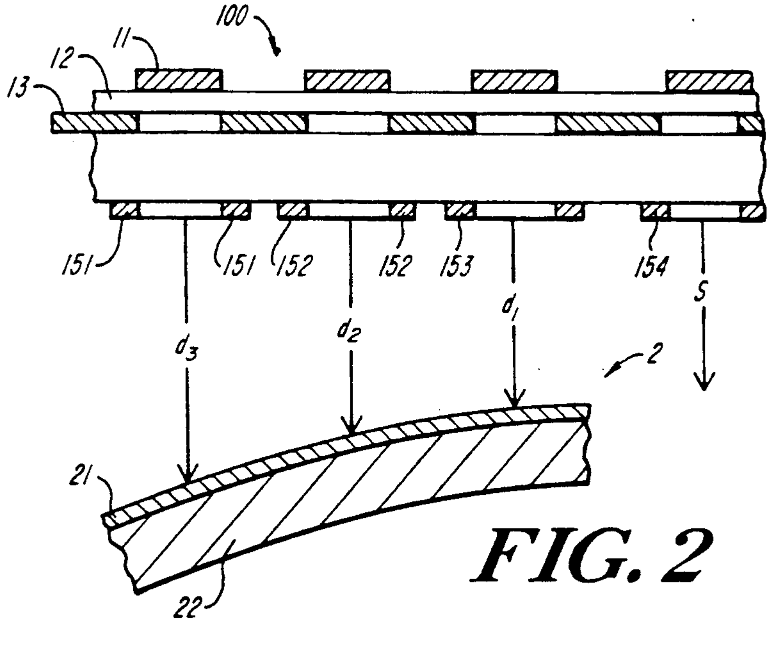
FIG. 2 shows a corresponding view of a print cartridge in accordance with the present invention.

The cartridge illustratively has seven driver electrodes 11, with seven screen electrodes 151, 152 . . . 157 positioned in registry over them. Each screen electrode has apertures 150*a* positioned over the charge generation loci. FIG. 2 illustrates the cartridge of FIG. 3 in cross-section, in a view corresponding to that of FIG. 1 to illustrate their difference. As shown, each screen electrode has a characteristic spacing $d_i$, which increases with distance from the center electrode 154. Specifically, when the drum radius is relatively large compared to the arc length spanned by the print cartridge, the drum surface drops off increasingly away from the center line, so that each screen electrode is spaced further from the drum surface than the next inwardly adjacent screen electrode.

In accordance with a principal aspect of this invention, the potential applied to each screen electrode strip 151–157 is of a magnitude to provide a constant field strength between the print cartridge and the drum. The rationale for such electrical control will be appreciated from a consideration of the drum charging characteristics.

In printers which deposit small dots of charge on a dielectric member, there arises a problem of dot "blooming". The size of a printed dot varies with the magnitude of charge deposited on the latent imaging member. The physical mechanism responsible for this variation in size is that as charge builds up on the surface of the drum, a tangential electric field of the latent image deflects incoming charged particles, thus broadening the dot size.

Figure 4:
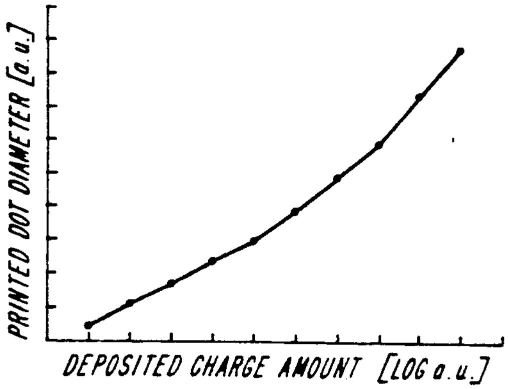
FIGS. 4 and 5–7 illustrate charge dot characteristics and their functional dependence on print cartridge parameters.

FIG. 4 illustrates the dot diameter of a printed dot as a function of the logarithm of the deposited latent image charge, in arbitrary units. By way of scale, a contemporary printer of this type may utilize a charge level of 1–5 picoCoulombs to print a 0.15 mm dot, with the latent image attaining a surface potential of between 50–250 V with respect to the drum conductive layer. The diameter of the toned dot rises as charge builds, and the shape of the curve follows from the fact that as the drum surface 21 is gradually charged by impinging charged particles to create the latent image, the surface potential rises, decreasing the drum-screen perpendicular electric field while at the same time building up the tangential field around deposited charge areas. This tangential field has a divergent nature that distinctly deflects all later-arriving particles. The resulting blooming effect has a major impact on the printed dot geometry, as shown in FIG. 4.

Applicant has further found that this blooming effect is strongly dependent on the electric field intensity in the print cartridge/drum gap, and depends relatively little on the precise screen-drum spacing. This dependence is illustrated in FIGS. 5, 6 and 7, in which particle beam shapes obtained for different printhead-to-drum spacings and different electric fields are plotted.

The beam shapes are calculated for dielectric surface layer 21 charged to a normal level for forming a toned image, and the model assumes that the charged particle beam includes a substantial proportion of free electrons, the divergent effect on accelerated ions being somewhat lower.

Figure 5:
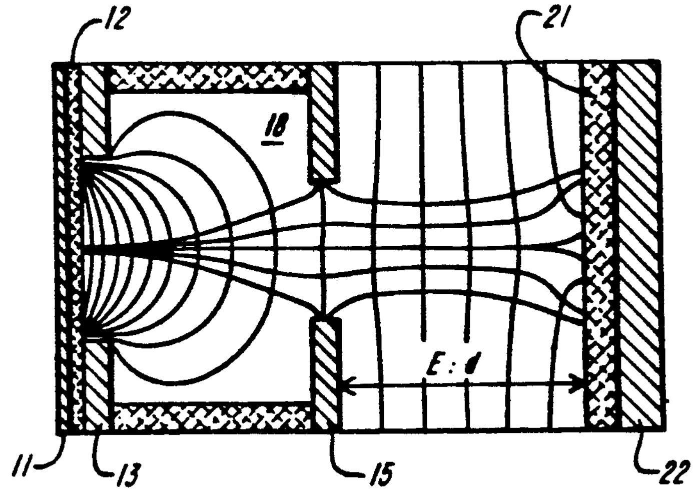
Figure 6:
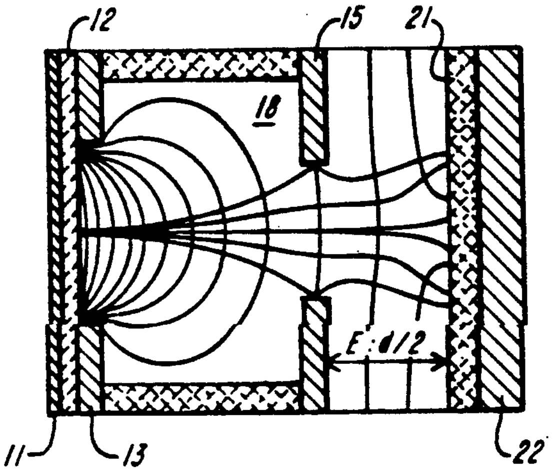
Figure 7:
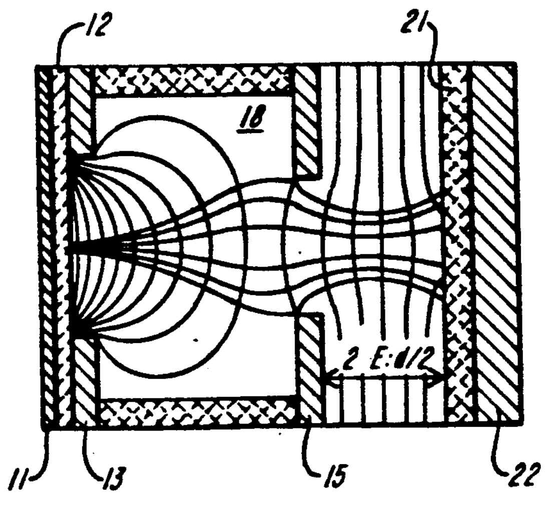

As shown in FIGS. 5 and 6, a constant electric field strength E produces essentially the same size beam at the drum surface at spacing d (FIG. 5) or d/2 (FIG. 6). That is, so long as the drum to screen voltage difference $V_{ds}$ is adjusted to maintain a constant field, the printhead can be moved to a greater spacing while maintaining the same beam size. As shown in FIG. 7, the dot size becomes smaller (compared to that of FIG. 6) if the drum to screen voltage is increased while the spacing is held constant. Thus, in applicant's print cartridge, the size of particle beam projected by apertures at the edge of the cartridge may be reduced by applying a higher voltage to the screen electrode over the edge electrodes. For example, if FIG. 5 is taken to represent the large gap of an edge hole of the print cartridge, FIG. 6 illustrates the same size dot achieved at a lower screen-to-drum potential across the smaller gap of a central electrode hole.

Such operation contrasts sharply with the limitations imposed by prior art print cartridges wherein the screen is formed of a single conductive sheet. In those printheads the screen is maintained at the highest potential possible without spark discharge, this limit being determined by the gap at the center electrode holes, and the common screen potential necessarily results in a lower field at the edge electrodes, causing more blooming, as shown, for example, by the comparison of FIGS. 7 and 5 applied to a prior art cartridge. That is, if FIG. 7 is illustrative of a normalized potential and small gap typical of the center electrode opening, FIG. 5 would illustrate the large dot obtained at an edge electrode opening of a prior art print cartridge with the same screen potential, hence lower field strength.

By contrast, in the practice of applicant's invention, taking FIG. 6 as representative of the normal center electrode beam, the same dot size is obtained at an edge electrode hole by increasing the potential in proportion to the larger gap, as illustrated in FIG. 5, in a manner to compensate for the divergent field caused by charge dot build-up. This corrects for the printhead to drum charge deposition geometry.

In FIGS. 5-7 the equipotential lines in the electrode cavity 18 are schematically indicated as they would be during the RF electrode actuation cycle, and show a somewhat divergent field which allows extraction of charge carriers primarily from the center of the electrode cavity. While the screen aperture influences the extent to which the drum potential can attract charge carriers from within this cavity, the primary mechanism for regulating the magnitude of the extracted charge is the difference in potential between the finger electrode and the screen. In prior art printers, the finger electrodes are switched between two different potentials with respect to the fixed screen voltage. For example, to extract a negatively charged beam to the grounded drum, the screen potential might be maintained at −650 V with the finger back-biased to −450 V in its OFF state, and the finger switched to −680 V in its ON state, causing negative charge carriers to move to and accelerated past the screen opening.

In accordance with a further embodiment of the present invention, the finger electrodes are switched to an ON bias voltage which is varied depending upon which RF line is being actuated, such that the finger-screen potential difference is the same for each hole of the array, despite the change in voltage applied to the different screen electrodes across the width of the print cartridge. This is accomplished by providing a multistep voltage source in which the voltage level provided to a finger electrode is controlled by or synchronized with the RF driver line selection signals.

Figure 9A:
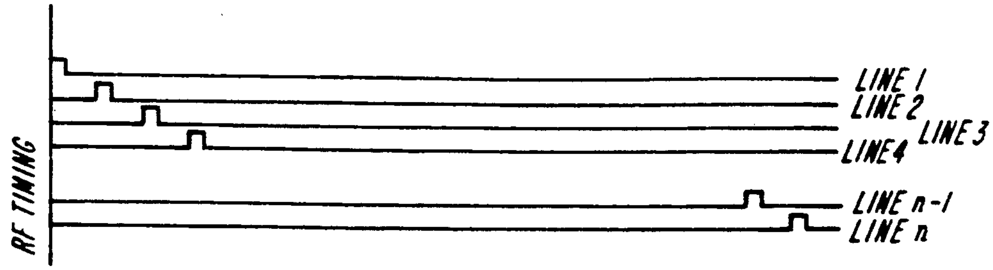
FIGS. 9A and 9B illustrate timing of control signals in the printer of FIG. 8.
Figure 9B:
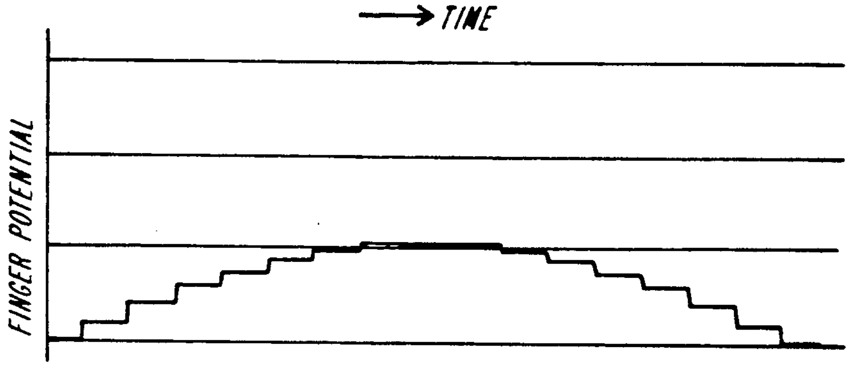

FIG. 9 illustrates control and timing waveforms of such a printer. At (A), the RF line selection signals are illustrated. One line connects to each line driver, and the RF drive lines are successively actuated for several microseconds each as the corresponding drive line (FIG. 9(A)) goes high for that interval. At(B) the corresponding finger potentials are illustrated. This is a step potential, with the number of steps corresponding to the number of screen electrodes, and the magnitudes of the steps corresponding to the differences in screen electrode potential of the screen electrode over the RF drive line that is active, so as to maintain a constant potential difference between the active finger and screen electrode.

Figure 8:
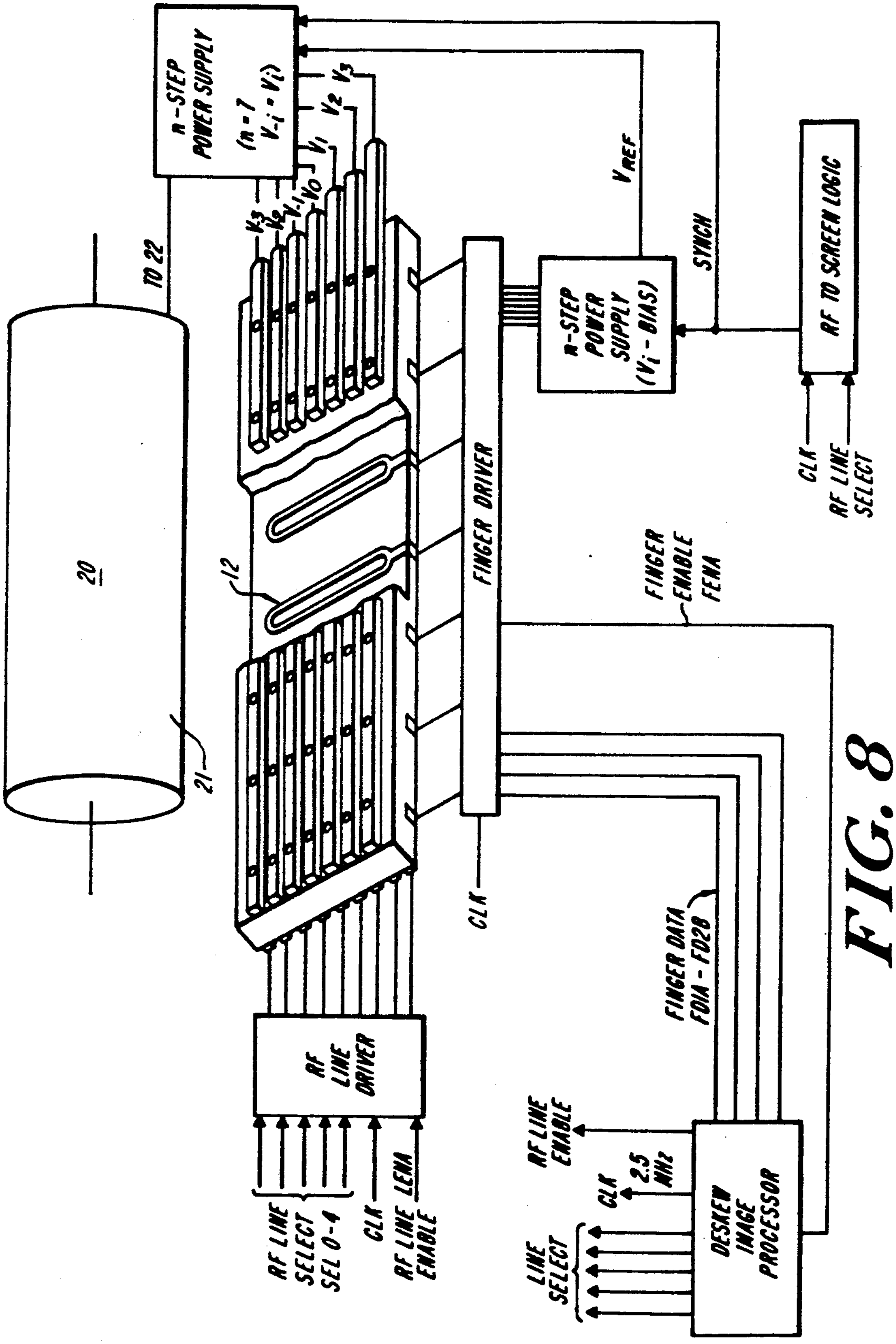
FIG. 8 is a block diagram of a printer in accordance with a further aspect of the invention.

The overall circuitry for effecting such printhead control is illustrated in FIG. 8. As shown, an n-step or multi-level power supply provides the different screen as well as the required finger voltage levels, and is switched to connect the appropriate voltage through a finger drive circuit to all fingers which are enabled at a given time. Since the screen electrodes are parallel to the RF drive lines and only the holes over an active RF line are fired at each time, it is not necessary that all steps of the power supply voltage be produced simultaneously, but the voltage level may be varied as a step function in time to provide the voltage which is required for only the fingers that are ON at the particular time. A simple logic circuit converts the RF line select code to a synchronizing word specifying the active screen strip, and the power supply provides both the required screen voltage $V_i$ and a corresponding finger voltage, equal to $V_i$ less the ON bias value. Alternatively, the supply may simultaneously produce all step voltages at different output terminals; in that case a fast n-to-one switching circuit connects the required voltage step to a common output from which all active fingers are energized.

In FIG. 2, the illustrated number of screen electrodes is identical to the number of RF electrodes. This arrangement leads to a simple correspondence between the RF line selection and the control signals for selecting finger bias voltage. In practice, however, the number of RF lines is in part dictated by practical considerations of the attainable manufacturing quality and cost for a given level of dot resolution, while the dot blooming and gap field uniformity may each be improved by decreasing the drum curvature and other factors. Accordingly, in other practical embodiments, the correspondence between RF lines and screen electrodes is not one-to-one, but rather one screen electrode may cover two or more RF lines.

Figure 10:
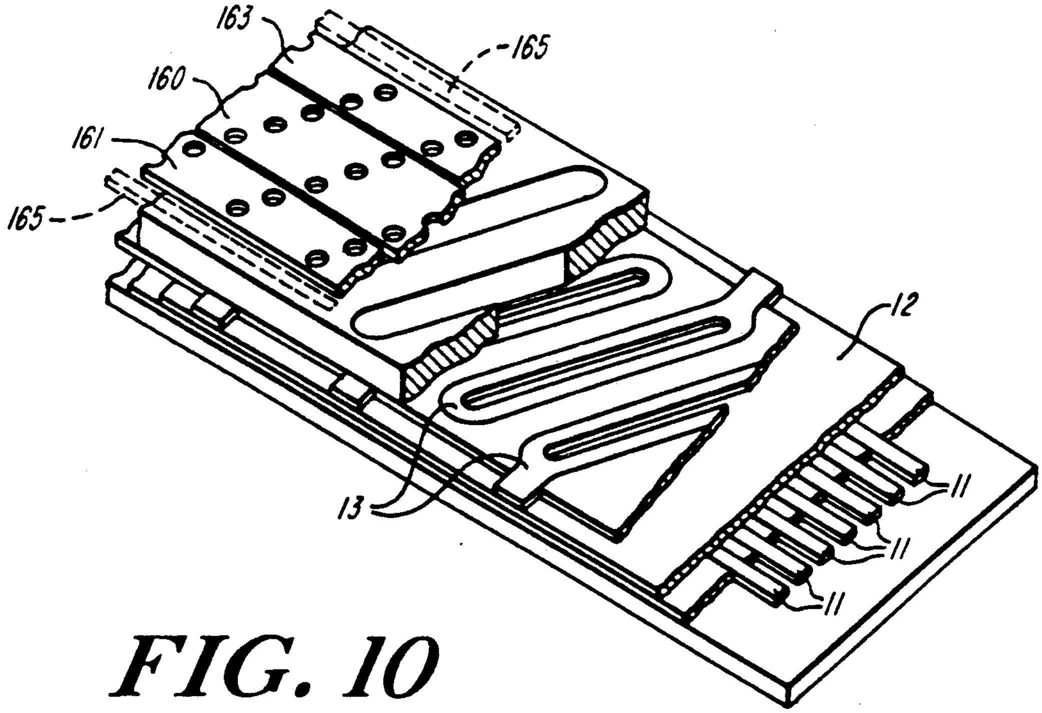
FIG. 10 illustrates another embodiment of a print cartridge in accordance with the invention.

Such a configuration is illustrated in FIG. 10, wherein three RF lines 11 lie below a single screen electrode 160 in the relatively flat-field portion at the central part of the print cartridge, while narrower screen electrode strips 161, 163 may overly fewer RF drive lines in the edge regions of the cartridge. It is expected that for a drum of suitable curvature, one screen for every two or more driver electrodes may suffice to provide sufficient field flattening at the edge of the field.

The invention also contemplates the provision of an additional dummy screen electrode, 165, i.e., one without apertures, which is located at the very outside edges of the printhead, and is maintained at a still higher potential to provide a further field-flattening effect in the edges of the printhead-to-drum gap. In practice, as few as three to five, or fewer, different potential levels may prove adequate to achieve uniformity in the delivered latent image charge dots. The screen electrode potential is a symmetric function about the centerline of the printhead, corresponding to the minimum gap.

It will be understood that the foregoing description has employed the term "drum" to indicate the latent image receiving member. This usage is adopted because a drum or roller member most naturally illustrates the changing print gap geometry to which the control structure of the invention applies. The invention is equally applicable, however, to other architectures in which the latent-image receiving member is curved, such as one in which the "drum" is a flexible dielectric belt which moves along a curved but not necessarily cylindrical path below the print cartridge. It may also apply to a curved imaging member such as a liquid crystal, phosphor screen or similar display panel in which the latent charge image is converted to a visible image. Accordingly, the term "drum", as used herein, shall include all such curved or curvable charge receiving members. Similarly, the invention has been described with respect to a particular form of print cartridge wherein crossing linear RF driver lines and oblique finger electrodes generate charge carriers at a multiplicity of points lying below the screen electrodes, but the invention contemplates other charge-generating structures. In such other structures, the screen electrodes may not lie parallel to any generator electrodes, but are parallel to an axis of curvature of the imaging member. In other respects the principles of the invention may be applied to diverse constructions.

This completes a description of the underlying principles and several basic embodiments of a printer in accordance with the present invention. The invention being thus disclosed, further variations and modifications will occur to those skilled in the art, and such variations and modifications are considered to lie within the scope of the invention for which letters patent are sought, as defined by the claims appended hereto.

What is claimed is:

1. An electrographic printhead assembly including a print cartridge for depositing a latent charge image by generation of charge carriers at a matrix array of charge generation loci and gating of generated charge carriers so that they pass from the loci to a latent imaging member positioned opposite the print cartridge, wherein the matrix array substantially fills an elongate strip extending along an axis oriented across a direction of motion of the latent imaging member, each point along a line in said latent imaging member parallel to said axis being equidistant from said print cartridge at a distance which determines an electric field between the latent imaging member and corresponding charge generation loci of the print cartridge, such print cartridge comprising plural first electrodes for receiving an actuating voltage to generate charge carriers plural second electrodes extending transversely to said axis and defining an array of charge generation loci, and plural third electrodes positioned between said second electrodes and the latent imaging member to define together therewith an electric field therebetween, said third electrodes extending parallel to said axis and being electrically isolated from each other such that when maintained at differing potentials the electric field between all charge generating loci and the dielectric imaging member is substantially uniform.

2. An electrographic printhead assembly according to claim 1, wherein one third electrode lies along a line of closest spacing to the dielectric imaging member, and further comprising means for applying potential differences between the dielectric imaging member and successive third electrodes, which increase with increasing distance of third electrodes from said one electrode.

3. An electrographic printhead assembly according to claim 2, further comprising means for applying bias potentials between ones of said second electrodes and associated third electrodes, effective to gate substantially uniform quantities of charge carriers from charge generation loci situated under different ones of said third electrodes.

4. An electrographic printhead assembly according to claim 1, wherein the first and third electrodes are conductive strips oriented parallel each other, the third electrodes having apertures therein for passage of the charge carriers from the charge generation loci.

5. An electrographic printhead assembly according to claim 1, further comprising means for synchronizing the application of voltages to at least one of said second and third electrodes, with an actuation signal applied to a first electrode.

6. An electrographic printhead assembly according to claim 1, further comprising means for selecting a voltage applied to a said second electrode in dependence upon a first electrode selection signal.

7. An electrographic printhead assembly according to claim 1, further comprising at least one fourth electrode positioned coplanar with said third electrodes and adjacent an outer edge of the matrix array for providing a field-flattening potential affecting transport of charge carriers at the outer edge of the matrix array.

8. An improved electrographic printhead assembly of the type having charge generation means including an array of electrode assemblies arranged to form a matrix of charged particle generating loci to be placed opposite a non-planar latent imaging member for depositing charge thereon as ones of said electrode assemblies are actuated, and screen means defining a generally planar conductive sheet interposed between the array of electrode assemblies and the latent imaging member, wherein the improvement comprises that the screen means is formed of plural separated conductors arrayed next to each other and each extending along a generally straight path all points of which are a substantially constant distance from the latent imaging member.

9. The improved electrographic printhead assembly of claim 8, wherein the conductors are strips oriented parallel to an axis of curvature of a curved latent imaging member.

10. The improved electrographic printhead assembly of claim 9, wherein the strips have apertures formed therein for passage of charge carriers through the screen means.

11. The improved electrographic printhead assembly of claim 10, further comprising electrically separated conductive edge strips located adjacent the screen means for carrying an electric charge for flattening an electric acceleration field at edges of the array.

* * * * *